Silas R. Kenyon. Picking and husking Corn.
No. 121,384. Patented Nov. 28, 1871.

Witnesses,
Chas. H. Smith
Geo. D. Walker

Silas R. Kenyon
per L. W. Serrell
atty.

AM. PHOTO-LITHOGRAPHIC CO. N.Y. (OSBORNE'S PROCESS.)

UNITED STATES PATENT OFFICE.

SILAS R. KENYON, OF GREENVILLE, RHODE ISLAND, ASSIGNOR TO HIMSELF AND WILLIAM D. VERNAM, OF ELIZABETH, NEW JERSEY.

IMPROVEMENT IN CORN-PICKING AND HUSKING-MACHINES.

Specification forming part of Letters Patent No. 121,384, dated November 28, 1871.

*To all whom it may concern:*

Be it known that I, SILAS R. KENYON, of Greenville, in the county of Providence and State of Rhode Island, have invented an Improvement in Machines for Picking and Husking Corn; and the following is declared to be a correct description of the same.

The present is an improvement upon the machine patented August 27, 1867, No. 68,085, and the improvement is made to prevent the ear being drawn into the picker-cylinder and insuring the breaking off of the ear from the stalk; also to adapt the machine very easily and rapidly to the different sizes of ears growing in the different sections of the country, or the varieties of the corn itself.

Figure 1:
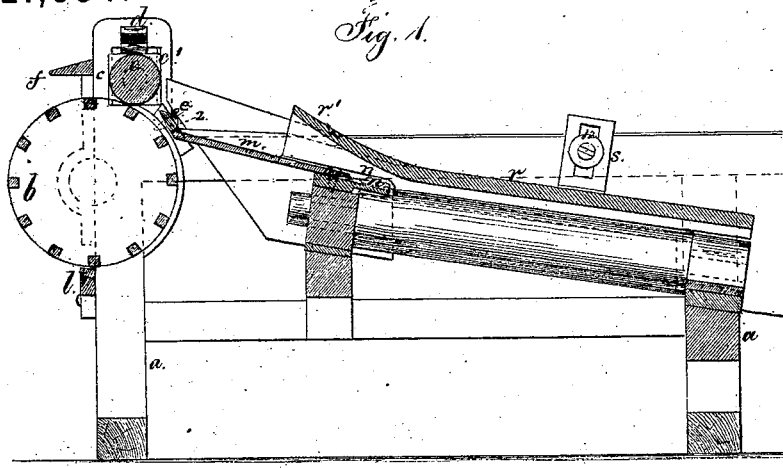
Figure 2:
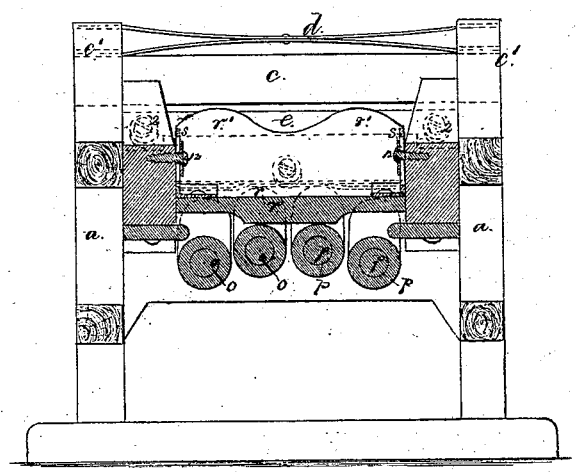
Figure 4:
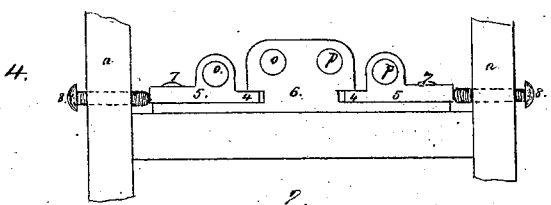
Figure 3:
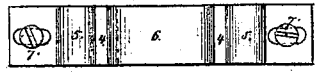

In the drawing, Figure 1 is a longitudinal section of my improved machine. Fig. 2 is a cross-section; Fig. 3 is a plan; and Fig. 4 an end view of the ends or bearings of the husking-rollers.

The frame $a$ is of suitable size, and the machine may be a single or a double-husker. I have shown the machine as double. The picking-cylinder $b$ is made of knives or metal bars set between heads or in any of the usual modes; and $e$ is the picker-roller, set in boxes $c'$, that can slide vertically; and $d$ is a double bow-string to give pressure by the ends acting between the slide that receives the boxes. $e$ is a cross-bar or plate contiguous to the cylinder $b$, and adjustable by slots and screws 2, so that greater or less space can be left between its upper edge and the picker-roller $c$.

In picking and husking-machines it is usual to place the roller $c$ vertically over the cylinder $b$, and it is often found in practice that the strength of the stalk causes the ear to be drawn in between the cylinder and roller and torn to pieces instead of the stalk or stem being broken, so that the ear drops back for the husks to be drawn off. I obviate this difficulty by placing the roller $c$ to the rear or feeding side of the upper portion of the cylinder $b$, as shown, so that as the stalks are drawn in they pass up the curved surface of the upper part of the picker-cylinder $b$, and, being held down by the roller $c$, there is a bend or angle made in the stalk that cracks and breaks the stem in a manner similar to the wrenching off of the ear by hand. The adjustable plate $e$ furthermore prevents the ear being drawn in between the picker-cylinder and the roller by forming a stop, against which the base of the ear is arrested. The bending up and breaking of the stalk between the picker-cylinder $b$ and roller $c$ tends to roll up the stalk into a hoop shape, and hence it sometimes might return upon the feeding side of the machine. This I prevent by the use of the plate $f$, beneath which the stalks pass out and are delivered nearly straight. The picker-cylinders heretofore used sometimes become clogged by the leaves wrapping around them. I prevent this by using a stationary clearing-bar, $l$, that is adjustable, so as to be brought nearly into contact with the bars of the cylinder $b$, so that any leaves or foreign substance will be cut and broken off. The ears of corn, as picked off the stalks, fall into the hopper or hoppers leading to the pair of husking-rollers, as in the aforesaid patent. I have shown the hopper-board $m$; but I have introduced a shield, $n$, over the upper ends of the rollers and attached the same firmly to the journal-boxes or frame to prevent the husks or beard being drawn into and winding around the journals of the husking-rollers $o\ o\ p\ p$. The journal-boxes of these husking-rollers have to be held firmly, and also adjusted. I therefore make the outer boxes 5 movable, and provide lips 4 4 on them to pass into recesses in the boxes 6 to hold down the boxes at these points, and employ clamping-screws 7 to attach the other sides of the boxes, and adjusting-screws 8 to force one roller in each pair against the other. The rollers are made of India rubber upon an iron shaft, and the surfaces of the rubber rollers are roughened with cavities or rectangular recesses, leaving edges that easily catch the husks and beard to strip them off. The cover $r$ is provided above the rollers $o\ o\ p\ p$, and the same is connected by ears $s$ with the sides of the machine, and said ears $s$ have slots or mortises through them for the screws 12, so that the cover $r'$ may be either raised or lowered to adjust it for different sizes of ears. The forward part of the cover $r$ is made flaring, as shown at $r'$, so as to facilitate the introduction of the ears and to present the ends or points of the ears first to the action of the rollers.

I claim as my invention—

1. The adjustable cross-bar or plate $e$ combined with the picker-cylinder $b$ and roller $c$ in the manner and for the purposes set forth.

2. The roller $c$, placed, as shown, toward the feeding side of the machine above the picker-cylinder $b$, and in combination with the same, so as to break the stems of the ears, as and for the purposes set forth.

3. The plate $f$, combined with the roller $c$ and picker-cylinder $b$, as and for the purposes set forth.

4. The clearing-bar $l$, applied to and combined with the picker-cylinder $b$, as and for the purposes specified.

5. The shield $n$, placed over the journal-boxes of the rollers $o$ $o$ $p$ $p$ of the corn-husking-machine, as and for the purposes specified.

6. The journal-boxes 5 of the husking-rollers, made with the projecting lips 4, and provided with the clamping-screws and adjusting-screws 8 8, for the purposes specified, the parts being arranged as set forth.

7. The adjustable cover $r$, provided with the flaring ends for the reception of the ears, and connected by the slotted ears $s$ and screws, so as to sustain the same in the proper position relatively to the husking-rollers, as set forth.

Signed by me this 2d day of June, A. D. 1870.

SILAS R. KENYON.

Witnesses:
CHAS. H. SMITH,
GEO. T. PINCKNEY.

(59)